UNITED STATES PATENT OFFICE.

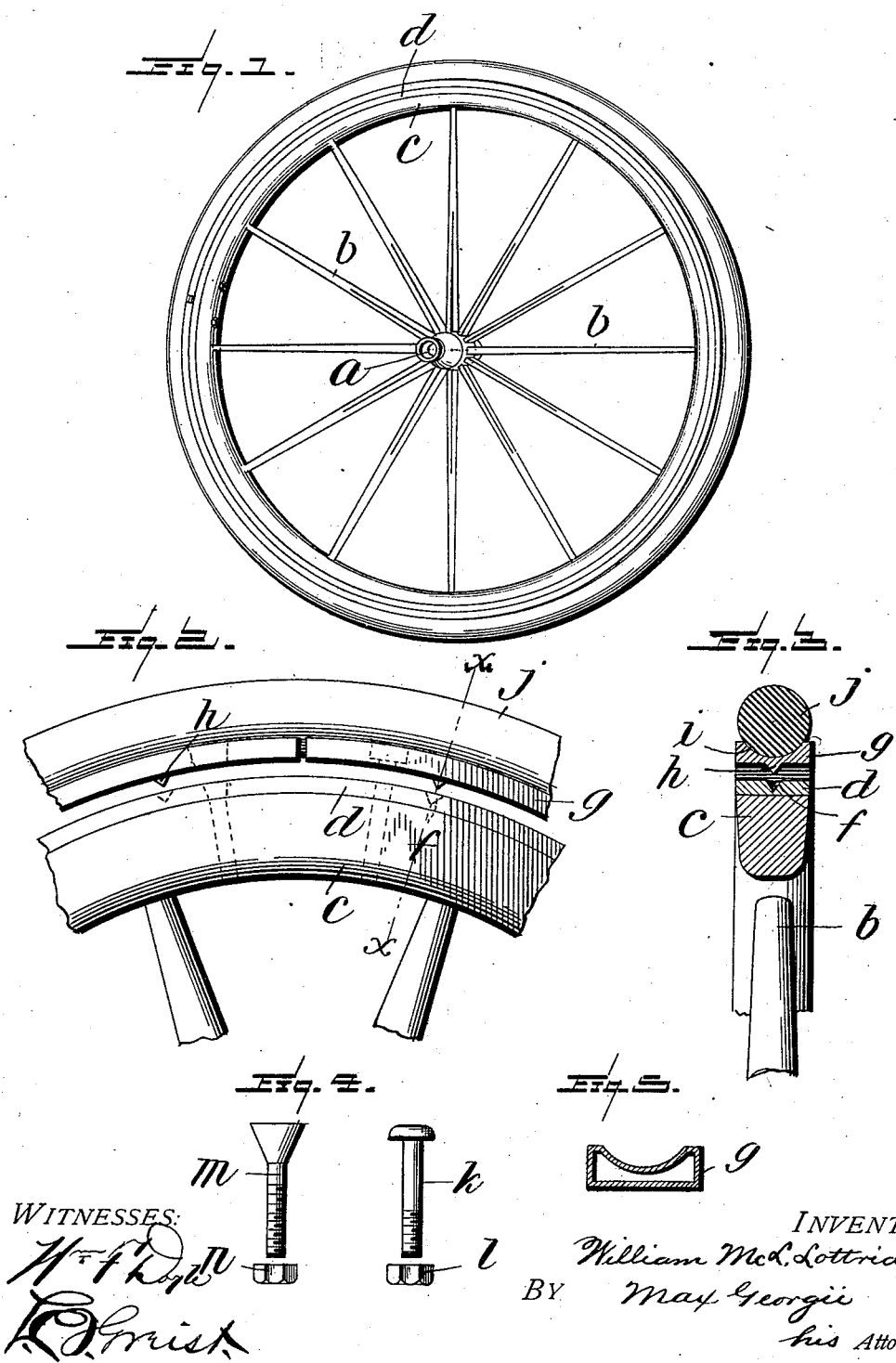

WILLIAM McLELLAND LOTTRIDGE, OF GALESBURG, ILLINOIS, ASSIGNOR OF ONE-HALF TO JAMES EVERNON HAPTONSTALL.

TIRE.

SPECIFICATION forming part of Letters Patent No. 711,729, dated October 21, 1902.

Application filed August 2, 1902. Serial No. 118,184. (No model.)

*To all whom it may concern:*

Be it known that I, WILLIAM MCLELLAND LOTTRIDGE, a citizen of the United States of America, residing at Galesburg, Illinois, have invented certain new and useful Improvements in Tires; and I do hereby declare the following to be a full, clear, and exact description of the invention, such as will enable others skilled in the art to which it appertains to make and use the same.

My invention pertains to tires for vehicles, and especially to detachable supplemental rubber tires for ordinary road-vehicles, such as wagons, carriages, and the like.

The object of my invention is to produce a tire that will combine a maximum of efficiency and durability with a minimum of expense, and convenience of adjustment.

It has heretofore been the case that supplemental tires adapted to be affixed to vehicles have been cumbersome, complicated in their arrangement, and difficult to attach to and detach from wheels which were not originally adapted therefor. In such cases it has been practically impossible for the owner of a vehicle to attach supplemental tires thereto without obtaining the assistance of a skilled mechanic or iron-worker at a very considerable expense and inconvenience. With the purpose in view of avoiding these objections I have devised a supplemental tire consisting of the several parts assembled in the relation hereinafter described, and illustrated in the accompanying drawings, in which like letters of reference indicate corresponding parts throughout, and in which—

Figure 1 is a view in perspective of a wagon-wheel embodying my invention. Fig. 2 is a detail view showing the relation of the parts.
Fig. 3 is a vertical section on the line X X of Fig. 2. Fig. 4 is a detail view of the bolts used for affixing the supplemental tire to the rim of the wheel and holding the same taut. Fig. 5 is a cross-section of a modified form of band.

The features of my invention will be readily understood by reference to the drawings, which show the wheel having the hub $a$, spokes $b$, felly $c$, the iron tire $d$, each of the ordinary construction and assembled in the usual relation, the tire being secured to the felly by the tire-bolts $e$. On the outer face of the tire $d$ at intervals are countersunk recesses $f$, preferably conical in form. Encircling the periphery of the wheel is the annular metal plate or band $g$, the ends of which approximately meet and which is provided on its face with projections or lugs $h$ at intervals adapted to fit in the recesses $f$. This band is provided on its outer face with the longitudinal groove $i$, adapted to receive and retain the ordinary endless rubber cushion or pneumatic tire $j$. The band $g$ is of a length sufficient to encircle the tire $d$, its ends coming just short of contact with each other.
One end of this band is provided with a bolt-opening adapted to receive the head of the bolt $k$, passing through the tire $d$ and the felly $c$ and secured by a nut $l$. The other end of the band is provided with a conical or wedge-shaped opening adapted to receive the conical head of the bolt $m$, which likewise passes through the tire $d$ and the felly $c$ and is engaged by the nut $n$, whereby when the nut is tightened upon the same the band $g$ will by the inclined face of the bolt-opening, in conjunction with the conical head of the bolt, be drawn taut and firmly held in peripheral contact with the iron tire $d$ and with the projections or lugs $h$ in engagement with the corresponding recesses $f$ and relative movement longitudinally or laterally absolutely prevented. The band $g$ may be a solid metal strap, as shown in Fig. 3, or for purposes of lightness it may be formed hollow, as shown in Fig. 5.

It will thus be seen that by my invention supplemental rubber tires can be quickly and economically affixed to any wheel, the only change necessary in an old wheel being the reaming of the conical recesses $f$ in the outer face of the ordinary metal tire and the drilling of the bolt-holes for the reception of the bolts $k$ and $m$. Also if it is desired to remove the supplemental tire the rubber tire need not be disengaged from the groove; but the nuts are readily removed from the bolts $k$ and $m$, and the band $g$, with the tire $j$, is slipped from the periphery of the iron tire $d$, the rubber tire having sufficient inherent elasticity to permit the band to be sprung outwardly to disengage the lugs from the recesses. The complete operation of attaching and detaching the tires therefore occupies but a few minutes' time, as contradistinguished from the supplemental tires ordinarily used, which can only be affixed and removed by means of special tools designed for the particular purpose and operated by a mechanic skilled in the art.

Wherefore, having thus fully described my invention, what I desire to secure by Letters Patent is—

1. A supplemental tire comprising an annular band having formed in its face a longitudinal groove and upon its inner face projections adapted to register with corresponding recesses formed in the outer face of the wheel, and means for securing said band to the outer periphery of the wheel with its two ends in juxtaposition.

2. A supplemental tire comprising an annular band having formed in its outer face a longitudinal groove and on its inner face, a plurality of projections adapted to register with and engage corresponding recesses formed in the outer face of the wheel and means for adjustably securing said band to the outer periphery of the wheel.

3. A supplemental tire comprising an annular band having formed in its outer face a longitudinal groove adapted to receive a rubber tire and on its inner face, a plurality of projections adapted to register with and engage corresponding recesses formed in the outer face of the wheel and provided at either end with bolt-openings and means for adjustably securing said band to the outer periphery of the wheel, consisting of a straight bolt and a bolt having a conical head portion.

4. A supplemental tire comprising an annular band having formed in its outer face a longitudinal groove adapted to receive a rubber tire and on its inner face a plurality of projections adapted to register with and engage corresponding recesses formed in the outer face of the wheel and provided at one end with an ordinary bolt-opening and at the other end with a conical opening, and means for adjustably securing said band to the outer periphery of the wheel, consisting of a straight bolt and a bolt having a conical head portion.

In testimony whereof I affix my signature in presence of two witnesses.

WILLIAM McLELLAND LOTTRIDGE.

Witnesses:
 EUGENE W. WELCH,
 W. G. KINNEY.